Dec. 29, 1970     A. L. HELLEWELL     3,551,114

METHOD AND APPARATUS FOR SYNTHESIZING MOLTEN MATERIALS

Filed March 28, 1968     6 Sheets-Sheet 1

INVENTOR.
ALONZO LEROY HELLEWELL
BY
CAROTHERS & CAROTHERS
HIS ATTORNEYS

Dec. 29, 1970  A. L. HELLEWELL  3,551,114
METHOD AND APPARATUS FOR SYNTHESIZING MOLTEN MATERIALS
Filed March 28, 1968  6 Sheets-Sheet 4

INVENTOR.
ALONZO LEROY HELLEWELL
BY
CAROTHERS & CAROTHERS
HIS ATTORNEYS

United States Patent Office 3,551,114
Patented Dec. 29, 1970

3,551,114
METHOD AND APPARATUS FOR SYNTHESIZING MOLTEN MATERIALS
Alonzo Leroy Hellewel, 201 9th St., Philipsburg, Pa. 16866
Filed Mar. 28, 1968, Ser. No. 716,960
Int. Cl. B01j 1/00; C06b 21/00
U.S. Cl. 23—266                                9 Claims

ABSTRACT OF THE DISCLOSURE

A liquid and flake of materials to be placed in liquified form by heating them in a vessel, for example, thixotropic materials, such as TNT, may be readily synthesized into a uniformly heated liquid, preparatory to casting, by directing a movement of a liquid mass thereof in coaxially concentric paths in the molten soup mass within an accurately heat-controlled kettle. The directed coaxially concentric flow paths fold and roll the liquid soup mass laterally of these flow paths to maintain a circular intimate intermixing of the liquid soup mass. This lateral flow of the liquid soup mass slowly also moves the sauce into intimate contact with the heat-controlled surfaces of the smooth kettle innerwall and a central tubular or cylinder wall within the kettle, which tubular wall also functions as the stem of the flow inducing and stirring device that directs the movement of the whole mass circularly and with coaxial concentric paths which movement also gently raises the central portion of the mass within the kettle while the perimeter of the mass is descending downwardly therein.

---

The central tube of this stirring device carries interconnected vertical arms spaced radially and angularly relative to each other, which induces the coaxial concentric flow paths in the mass.

The interior of the tubular stem, the vertical tubular arms and the radial connections therebetween, all provide a return flow of a circulating heating media such as hot liquid, steam or other heating fluid, to maintain a constant temperature of the outer surfaces of all these parts exposed to maintain an accurate temperature control of the concentrically, constantly moving mass.

The arms may well move in a circular path as parts of the stirring device or some arms may move as part of the stirring device while intermediate arms remain stationary. Again these vertical arms may be disposed at angles to induce different lateral flow actions of the concentric flow paths creating local rotary currents in these intermixing concentric paths. The dispositions of the faces of these vertical arms or blades force lateral movement of this heavy liquid mass against the adjacent surfaces of the heated stirring device and kettle walls.

The bottom of the stirring device connecting the arms trowels the mass against the inner heated wall and bottom surface of the kettle and toward the outlet which is preferably not coaxially of the flow paths and this portion of the stirrer device may have the same general contour of a sectional line of the inner kettle surface. The stirrer device induces the upward axial flow of the mass.

BACKGROUND OF THE INVENTION

The field of this invention is two-fold in that it deals with heating kettles that may also be used as chemical reaction tanks classified in chemistry class 23, subclass under apparatus, namely, tanks and specifically subclass 285, chemical reaction tanks including such references as Pat. No. 3,039,859, Apparatus for Preheating Chemically Reacting Materials and Pat. No. 3,049,413, Polymerization Apparatus.

The other phase defining the field of this invention is the fact that the material synthesized when cooled is a solid explosive found in class 86, Ammunitions and Explosive Charge Making, subclasses 1 and 20, namely, Miscellaneous and Loading Fireworks and Bursting Charges represented by Pats. Nos. 3,004,462, Method of Producing An Elongated Flexible Hose-Like Explosive Column, and 3,107,574, System For Deaeration and Casting of Elastomer Bonded Propellants, and 3,111,058, Apparatus for Casting Thixotropic Material.

The prior art is demonstrative that the methods and structures therein shown do not solve the problems of thermally controlling the synthesizing kettles and chemical reaction tanks for making and casting the thixotropic materials while maintaining a deaerated and uniformly mixed and uniformly heated liquid mass for casting which problems are solved by this invention.

BRIEF SUMMARY OF INVENTION

This invention is directed to the method and apparatus for deaerating and simultaneously uniformly mixing while accurately controlling the heating of explosive material in chemical reaction tanks and thereafter discharging the same for casting charges. In carrying out this method, the simultaneously and continuously uniformly heating and mixing with stirring arms of the explosive material, such as TNT, is accomplished by directing the liquid of material to move in coaxially concentric paths which folds the material laterally in homogenous intimate mixture and in engagement with the internally exposed and heated surfaces of the heated mixing kettle. The coaxially concentric mixing paths all move in the same circular direction. Any intermediate concentric paths may be created by stationary stirring devices disposed intermediate of the coaxial paths that provides lateral movement in both directions but preferably toward the center of the liquid mass.

The stirring arms, whether rotary or stationary, are preferably canted to direct the movement of the mass in coaxial concentric paths laterally in one direction or the other to guide it toward the heated kettle walls or the heated central member of the stirring device while the mass as a whole moves in a circular direction. These arms are provided with return heating fluid flow paths in the interior thereof so that their entire mass exposed surfaces are accurately heat controlled to maintain the thixotropic mass at a constant temperature. In visualizing the movement of this mass without structure, the outer shape of this heated liquid mass is substantially cylindrical or parabolic and the whole of the same rotates in direction about a central axis. The intermediate concentric flow paths force the movement of the mass as a whole at a speed slower than that of the stirring device. The lateral deflection from these paths is enhanced by the angular disposition of the arms whether movable or stationary. This angular disposition of the arms induces, with the inner kettle surface, a rolling action on vertical vorteces. These may work from an inner flow path across an outer flow path. The outer flow path produced by an arm being adjacent to the kettle wall may actually squeeze the heated liquid mass through this smaller space, created by the angular disposition of these arms and the bottom of the stirrer, so that the velocity of the thixotropic material movement through this smaller space is increased. This is possible due to the consistency of the mass being treated and because it is precisely controlled through a specific temperature range. The mass may be of a watery consistency, but may also be mushy depending upon the temperature and the amount of flake material that is fed to the liquid thixotropic material. The rate of adding flake material also has an effect on the temperature and its uniformity throughout the mass. At 165° F. to 168° F.

it has a mush consistency. At 190° F. it is in a liquid state. At 205° F. it is dangerous to handle.

Thus it is important that the structure, namely the kettle and the stirers, have smooth polished surfaces and are provided with enclosed circulating paths to direct the movement of the fluid for heating. These structures may be chrome plated. The whole of the kettle and lid surfaces are heated as well as the stirring device surfaces since they are all exposed to the mass being treated. Thus uniformity of heating the mass reduced the time of melting a proper percentage of the flake to make the whole of the mass ready to pour into prepared molds or be received by a holding tank until ready for pouring. Such holding tanks maintain the thixotropic material in its liquid state.

Another advantage of the structure comprising this invention is obtained by reason that the stirring device lends itself to a shorter and more readily controllable source of heat transfer to the mass making the center of the mass and the stirring paths higher in temperature and thus making the mass quickly more fluid which, in turn, induces better intermixing to provide more soup uniformity of the mass as a whole. This is because of the fact that the relative movement of the thixotropic material against the arms is faster or greater. These are the factors that reduce the running time in operating this kettle one hundred percent over that of the present equipment.

It should be understood that the present invention is not limited to synthesizing thixotropic materials. The structural principals of the present invention may be used also in other unrelated fields where materials are to be synthesized by uniformly mixing while accurately controlling the heat applied to the materials during the mixing operation. For example, in the cosmetic field, it is necessary to uniformly heat various types of cosmetic materials to a specific temperature while carefully blending the same to produce a desired texture and mixture. A prime example of this is materials used to manufacture lipstick. Other objects and advantages appear hereinafter in the following specification and claims.

The accompanying drawings show, for the purpose of claims thereto, certain practical embodiments illustrating the principles of this invention wherein:

Figure 1:
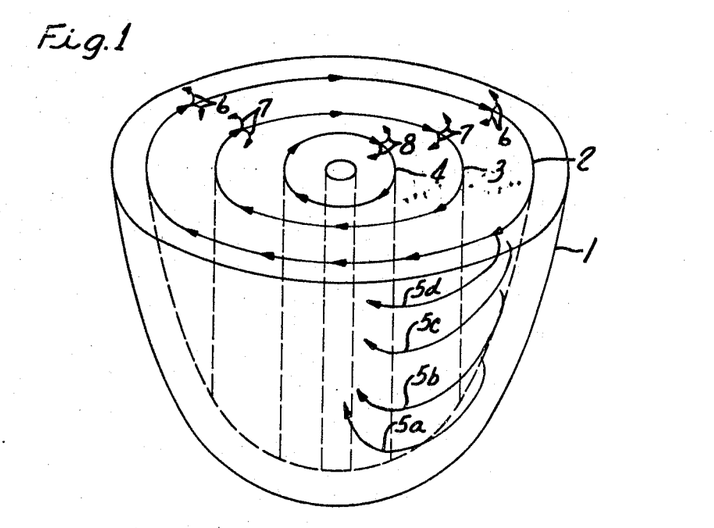
FIG. 1 is a diagrammatic view of the mass being treated in a kettle having a shape of substantially parabolic form.
Figure 5:
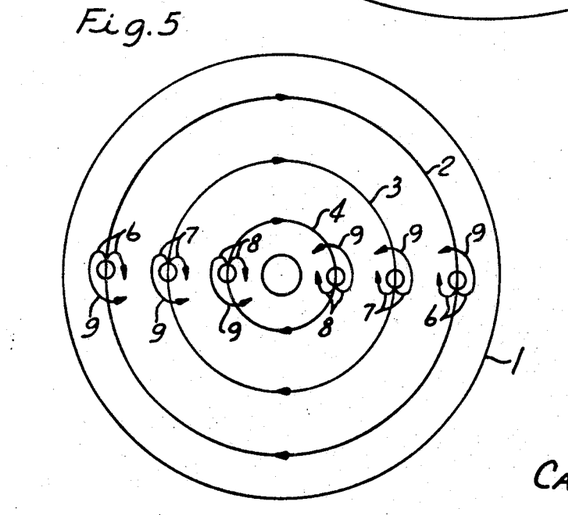
FIG. 5 is a diagrammatic plan view of the mass being treated in the kettle of FIG. 1.

In FIGS. 1 and 5 there is shown the liquid mass 1 which assumes the substantially parabolic shape of the kettle so that any detonation of the same will discharge the mass upwardly lifting anything in its path but it will not have a tendency to be destructive downwardly or laterally.

The mass 1 will have a general movement in a clockwise direction when viewed from above and as indicated by the arrows in FIG. 1. The whole of the mass 1 is caused to rotate clockwise owing to the fact that the stirring device having upwardly extending fingers is rotated in a clockwise direction. The outer finger of the stirring device rotates in the path 2 which lies closely adjacent the inner kettle surface which would be represented by the outline of the mass 1. The second upwardly projecting finger creates the second circular or concentric path of movement 3 and the third and last finger represents the path of movement 4. The outer circular path 2 extends to the bottom of the axis of the mass and, of course, moves at a faster rate adjacent the upper surface of the mass 1 than at that part of the mass near or adjacent the bottom of the kettle. In like manner, the material moves slower in the circular paths 3 and 4 as compared to the path 2 because of their distance from the center of rotation. Thus, as the moving mass is rotated by the stirring device, there is a tendency to have the whole of the perimeter of the mass move downward because of the slower inner concentric movements in the paths 3 and 4 as compared to that movement found in path 2. This creates a movement downward on the outside of the mass and an upward movement at the center of the mass as indicated by the series of arrows 5a, 5b, 5c and 5d, the points of these arrows being generally inwardly toward the center and upwardly in the center of the moving mass. It will be noted that the bottom-most arrow 5a has a tendency to curve up more rapidly than the uppermost arrow 5d. The reason for this is that the mass does not travel in an essentially vortex path but provides a generally downward and inward and then upward force in the center where there is present slower moving portions of the mass. A greater inward and upward movement of force would be expected from the center of the mass 1 and down to the bottom of the entire mass than that portion of mass adjacent the top of the entire mass. In other words, 5a would create a greater force than 5d in moving the mass because it is downward and inward to a greater degree.

Aside from the general tendency for the mass to rotate and move downwardly at the outer portions thereof and then upwardly within its center, the specific paths of movement 2, 3 and 4 will also provide small circular paths in front of the stirring fingers causing the mass to move laterally in opposite directions as indicated by the smaller arrows 6 in the path 2 and the smaller arrows 7 in the path 3 and the smaller arrows 8 in the path 4. Obviously this lateral turning motion within the mass, as indicated by the arrows 6 to 8, folds into the material from the adjacent stirring path causing the material to intermix and aid in producing this general downward and upward movement of the mass.

If the material is at a temperature of approximately 168° F. it appears to be quite thick because it is beginning to become solid or mushy and in this condition it has greater viscosity. At 190° F. the material is quite liquid and therefore between these temperatures there would be different degrees of viscosity which could occur in the operation of stirring of the soup mass. Again in different parts of the kettle and on different parts of the stirring device, if slightly cooler, the material could become mushy around these cooler points and the whole purpose of heating the stirring device and heating the kettle is to provide as much uniformly heated kettle and stirring device surface as possible contacting the mass at a uniform heat to maintain the whole of the mass of liquid at a near constant temperature of 190° F. Thus, by inducing these flow paths one is enabled to fold and innerfold the mass of liquid so that each portion thereof is constantly kept in contact with these heated surfaces to maintain a temperature that is uniform throughout the whole mass which is the principal object of this invention.

The maintenance of uniform temperature is very critical in the case of thixotropic materials such as TNT and more so in newer explosive materials which are highly unstable. The kettle and stirring device disclosed herein are capable of maintaining the soup mass within ½° F.

of the prescribed temperature. With respect to TNT, the temperature must be controlled within 5° F. of the prescribed temperature.

In the diagrammatic FIG. 5, there is represented the type path movement taken by the mass as it is split by the stirring fingers and moved laterally as indicated by arrows 6, 7 and 8 to work the mass into a uniform consistency at the desired temperature. The mass then, as split, partakes a coiling swirling motion as indicated by the arrows 9 and is directly inwardly toward the path of the next inwardly adjacent stirring finger which finger brakes or splits the mass again to cause additional swirling motion resulting in the folding and intermixing of the entre mass.

Figure 2:
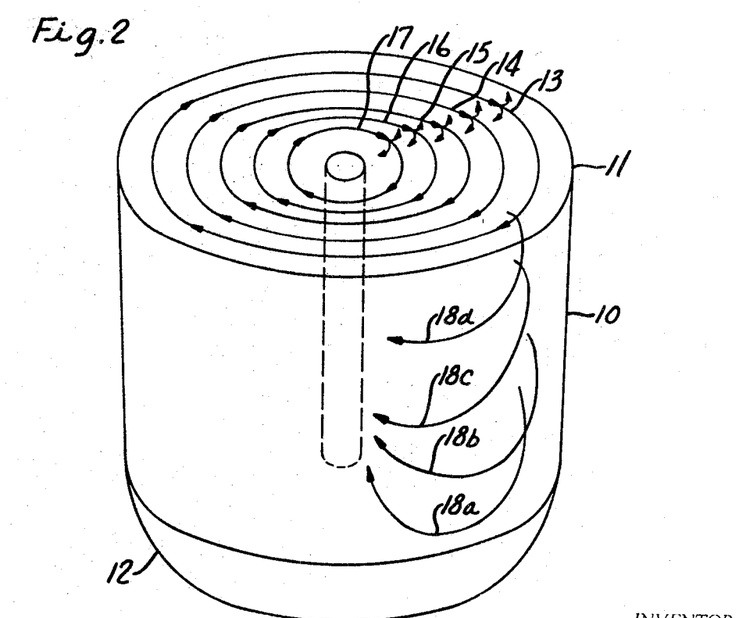
FIG. 2 is a diagrammatic view of the mass being treated in a kettle having a shape of substantially cylindrical form with a bulged or semispherical bottom.

A substantially cylindrical kettle may be employed, as shown in FIG. 2, wherein the kettle wall 10 has a slightly larger upper rim 11 than the bottom rim 12 and in which the bottom is also semi-spherical. The purpose of showing this arrangement is to indicate how a larger volume of material of substantially cylindrical shape can be made to have the same motion as a smaller volume of material shown in FIGS. 1 and 5. The stirrer forming the flow paths 13, 14, 15, 16 and 17 is made in the form of a lyre illustrated in FIG. 8 wherein all of the stirring finger members are substantially parallel and extend in a vertical position. Each of the stirring paths formed function to move the mass in a clockwise direction, as indicated, and they also provide lateral movement of the material to fold the material against itself between adjacent stirring finger members. Again the whole of the mass folds downwardly and inwardly as illustrated by the series of arrows 18a, 18b, 18c and 18d to effect the same character of movement as explained in connection with the mass of FIG. 1.

Figure 3:
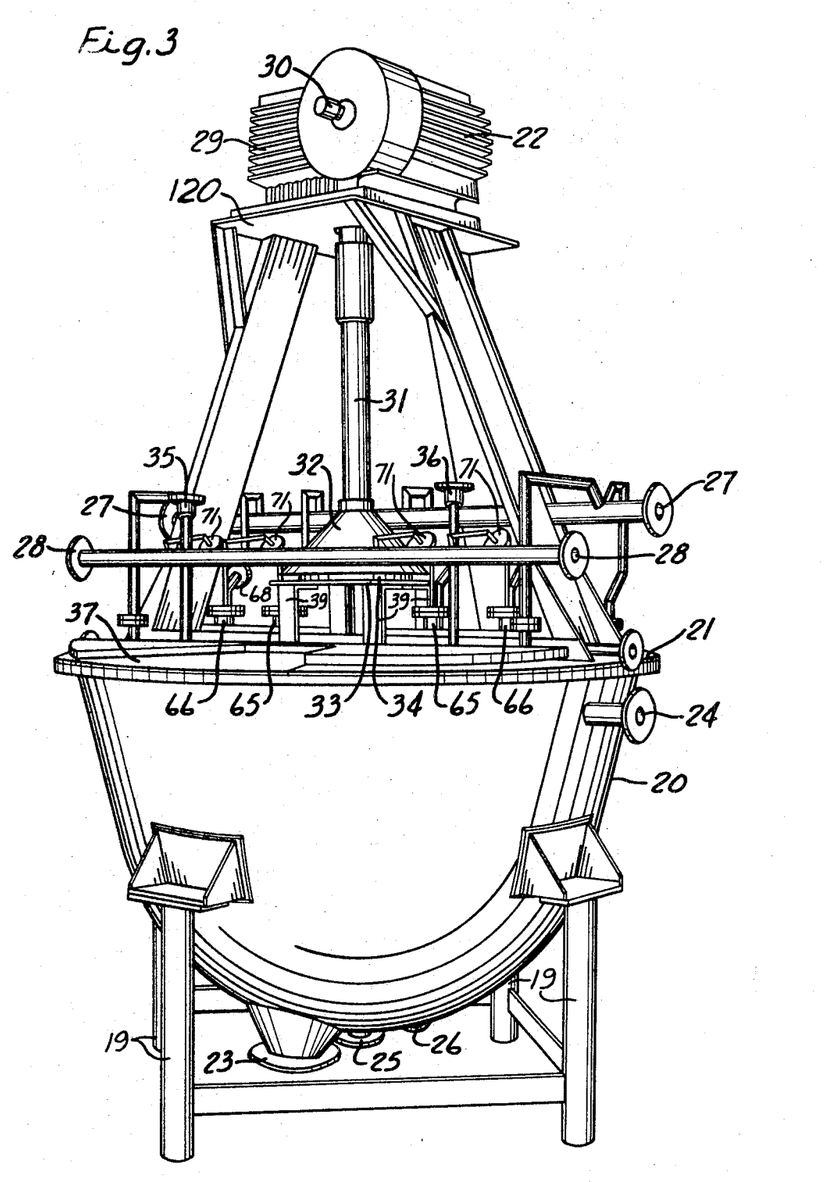
FIG. 3 is a perspective view of the preferred embodiment of the kettle comprising this invention with its lid closure.

FIG. 3 is a perspective view of the whole of the apparatus comprising, generally, the kettle or vessel 20, the top or closure lid 21 and the drive 22 for the stirring device. As shown, the kettle 20 is preferably supported above the floor by legs 19, there being four in number, and the only discharge outlet for the kettle is indicated by the large flange opening 23. The heating lines for the kettle vessel are indicated by the tubular inlet 24 and the tubular outlets 25 and 26 at the bottom kettle 20.

Figure 6:
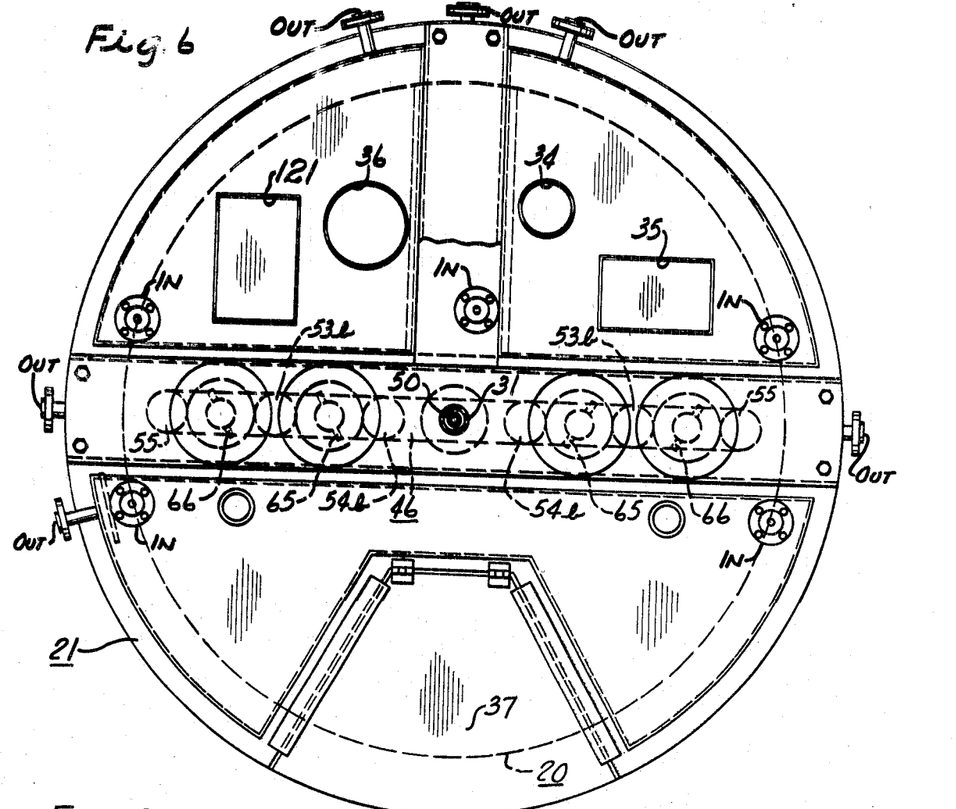
FIG. 6 is a plan view of the lid of the kettle with parts removed.

There is a series of two manifolds for supplying heat to the lid 21 of the kettle. The upper manifold 27 indicates a steam inlet with the lateral connections to a series of positions in different sections of the lid as illustrated in FIG. 6. The outlet manifold indicated at 28 has smaller connections made to other and different portions or sections of the lid for discharging steam or condensation therefrom.

The drive 22 of the stirring device includes a gear reduction 29 at the top of the stack 120 operated from an input shaft 30 and rotating the vertical shaft member 31 at a speed of approximately 25 r.p.m.; however, this speed may be changed as desired and is usually accomplished exterially of the building in which the kettle is housed.

The outer shaft 31 also is a coaxial tube which supplies or discharges steam or heated fluid to the stirring device 46 as will be explained in more detail below.

At the lower end of the shaft 31 a cover 32 with a collar is provided, frusto conical in shape, covering a platform 33 supported by legs 39 for the purpose of carrying a bearing 34 which is maintained outside of the kettle chamber. The bearing 34 supports the suspended stirring device from platform 33, as no portion of the stirring device would be permitted to touch or otherwise have a close proximity with anything within the kettle 20 for fear that it might rub producing friction or causing a spark igniting the material in the situation where the thixotropic material is involved.

As shown at 34 and 36 in FIG. 6, a pair of tubular connections are provided for supplying liquid TNT into the kettle. Usually only one inlet for TNT liquid material is necessary but at times an additional opening is necessary. There are additional openings in the lid 21, one opening 35 for feeding flake and another opening 121 for feeding small sized scrap material to the liquid mass within the kettle. In processing and synthesizing the TNT within the kettle 20 a quantity of the heated liquid TNT is inserted through the opening 34 and then the flake material or small sized scrap may be added continuously or periodically through openings 35 and 121 as the case may be, by means of a vibratory feeder or other similar structure which would be preferably operated by pneumatic drive motors.

The lid 21 is provided with a door 37 which is opened by means of a pneumatic cylinder (not shown) for the purpose of inspecting the interior of the kettle.

Figure 4:
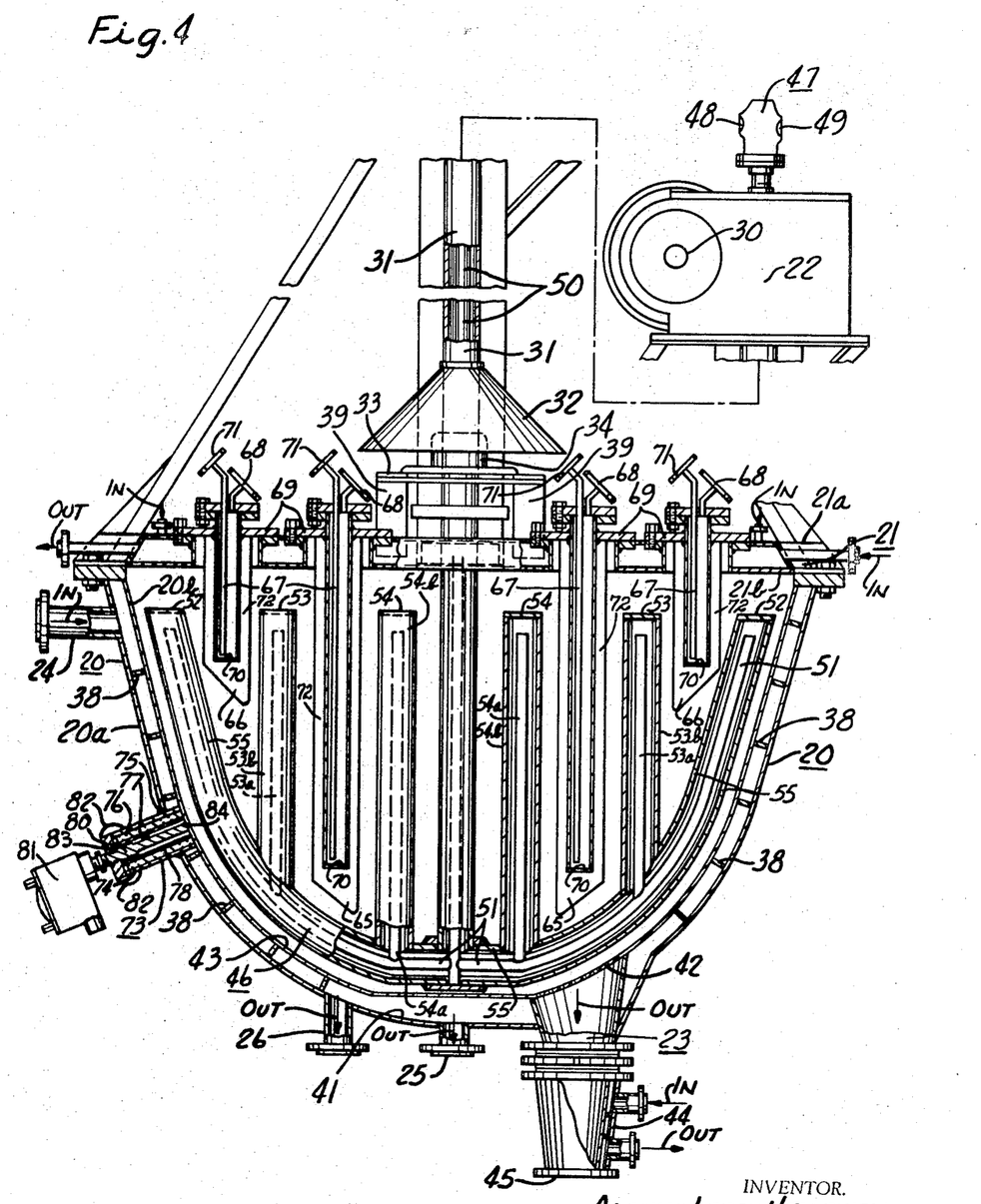
FIG. 4 is a view in cross-section of the preferred form of the kettle and stirring device.

As shown in FIG. 4, the kettle 20 with its lid 21 are constructed to have double walls as illustrated at 20a and 20b and 21a and 21b, respectively. The parabolic wall of the kettle 20 is provided with a helical partition 38 which provides a helical path downwardly from the inlet 24 to the outlet 26 which is offset from the axis of the kettle. The outlet 25 is directly on center at the bottom of the kettle as shown in FIG. 4. Thus, when seam or hot water or other suitable heating medium is induced in the inlet 24 it travels in a circular helical path between the walls 20a and 20b until it is finally discharged out of either outlet 26 or 25 or both from the bottom portion and chamber 41 in the double wall kettle 20. The chamber 41 surrounds the outlet 23 at the bottom of the kettle. The outlet 23 from the heating chamber 43 within the kettle is provided with a screen 42 across its conical opening. As shown in FIG. 4, flange connections are made from the kettle outlet 23 to a reducer coupling 44 which is also provided with the double walled construction and a helical partition for circulating steam or heated liquid therethrough to maintain the heat of the liquid thixotropic material as it passes out the opening 45 at the bottom of the reducer coupling 44. Connection would be made from opening 45 through another pipe to a holding tank to receive and maintain the thixotropic material at the desired temperature.

The stirring device 46 shown in FIG. 4, is, as previously mentioned, supported solely by the shaft 31 in the flanged tapered roller bearing within the bearing member 34. The stirring device 46 is a hollow member having a hollow network chamber and has a tube or shaft 31 extending upwardly through the gear drive 22 and provided with a rotary union 47 for receiving the steam at the inlet 48 and discharging the heating fluid from the outlet 49. The inlet 48 is connected to the inner coaxial pipe member 50 that extends to the bottom of the stirring device and is welded to oppositely extending lateral sections 51 that terminate in the outer fingers 52 of the stirring device. Each of the intermediate fingers 53 and 54 have interconcentric pipes 53a and 54a, respectively, connected, as by welding, to the lateral sections 51 and these pipe sections also deliver the heating medium such as steam or hot water to the outer ends of these fingers. Thus, the coaxial pipe sections 50, interconcentric pipes 53a and 54a, the lateral pipe sections 51 and the shaft 31 may be referred to as the interconnected tubular means. The fingers 53 are preferably shaped to provide predetermined flow characteristics to the body; however, as shown in FIG. 4, the members making up the stirring device 46 and the outer coaxial tube 31 are of cylindrical shape.

The lower end of the outer tube 31 of the stirring device 46 is provided with laterally extending pipe sections 55, the outer ends of which terminate the ends of the fingers 52. The inner pipe members 53b and 54b are connected, as by welding, to the lateral extending pipe sections 51. Thus, steam may be supplied as the heating medium and is released through the inner pipe member 50, thence through the lateral pipe sections 51 and thereafter to the end extremities of the fingers 52, 53 and 54 where it then flows backwardly around and over the pipe sections 53b, 54b and 55 and thence upwardly through the tubular shaft 31 and out the discharge 49. Thus all surfaces of the stirring device 46 are directly heated to permit uniform transfer of heat to the liquid or viscous soup mass, the steam flow depending upon the desired temperature that the mass is to obtain. In the case of TNT, the temperature to be maintained is to be 190° F. and this can be maintained within ½° F. by the apparatus comprising this invention.

Water or other liquid media can be used in the heating of the kettle 20, lid 21 and stirring device 46. In the case of water, it is preferable that the water enter at 49 and proceed down the outer shaft tube 31, thence through the lateral sections 55 and the outer pipes 53b and 54b. The water then is returned through the fingers 52, 53 and 54 and the lateral sections 51, thence up the inner coaxial pipe member 50 and out at 48. With respect to steam, it may be placed in either inlet 48 or outlet 49 and thus directed through the stirring device 46 in either direction. However it is preferable that steam enter through inlet 48.

Figure 8:
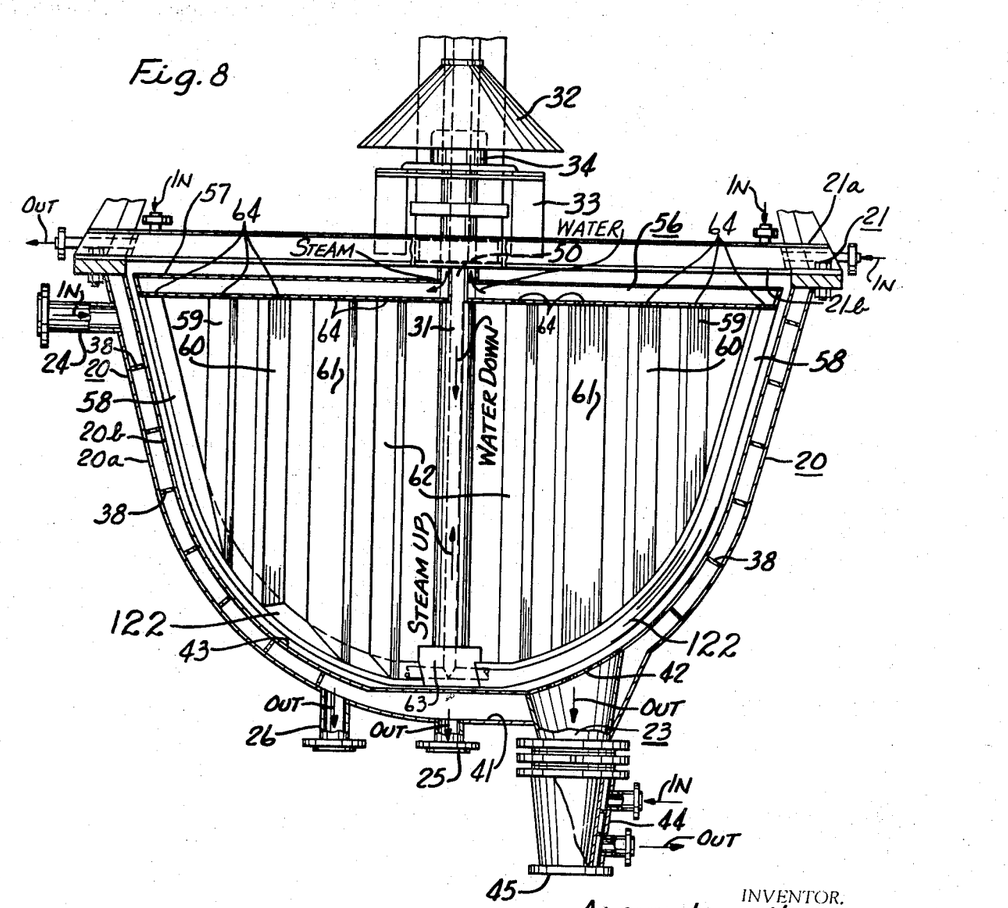
FIG. 8 is a view in section showing a modified form of the stirring device.

In FIG. 8, a modified form of the stirring device 56 is shown and is supported by the tubular shaft 31 and bearing member 34. The stirring device is provided with a horizontal arm member 57 which in turn connects each of the tops of the fingers 58, 59, 60, 61 and 62. No stationary hot fingers are dependent from the lid 21 as in the case of the stirring device shown in FIG. 4 and explained hereinafter. The fingers 58 through 62 are preferably made with a cross-sectional configuration of eliptical shape or rectangular tubular shape so as to provide deflecting surfaces to more accurately direct the stirring flight of the liquid or viscous soup mass to induce the proper current movement of the mass and maintain a large surface contact of the stirring device 46 with the mass to keep in the proper heated state. Here the tubular shaft 31 and its concentric pipe 50 extend to the bottom of the later arms 122 from whence it is opened to the laterally connected fingers 58 as shown at 63 and the bottom of each of the arms are thus directly connected with the interior of the arms 58 to provide a series of parallel paths for directing the steam or water flow through each of the fingers. Orifices such as indicated at 64 in the lateral arms 122 may be sized to properly distribute the amount of flow of steam or heating liquid through the respective fingers. If steam is employed, it is conducted downwardly through the outer shaft or tube 31 passing through the respective orifices 64 into the respective fingers 58 to 62, inclusive, and being collected at 63 and then flowing upwardly through the inner pipe member 50 as indicated by the arrows in FIG. 8. If water is employed as the heating medium the water is preferably circulated down through the pipe 50 as indicated by the arrow marked "water" and is distributed laterally up through the fingers 58 and the other fingers 59, 60, 61 and 62 in parallel therewith to the lateral arms 122 from whence it flows upwardly through the outer hollow shaft 31 to the point of discharge. It appears to be better to control the flow of the two systems, steam and water, in opposite directions because of the capability of respective media (either steam or water) to function to uniformly heat, by the process of heat transfer, the stirring device in the manner described.

Referring to FIG. 4 again it will be noted that there are four additional fingers 65 and 66, the former extending between the fingers 52 and 53 of the stirring device 46 and the latter extending between the fingers 53 and 54 of the stirring device. These fingers are stationary, depend from the cover 21 by means of the flange 69, and are hollow members having inner tubes 67 for the same purpose as the stirring device to permit the circulation of steam or hot water. The inlets are shown at 68 wherein the steam proceeds to the bottom 70 of the stationary fingers 65 and 66 and thence proceeds up the inner tubes 67 and out the outlet 71. The outlets 71 are connected to the manifold 28 and the inlets 68 are connected to the manifold 27 as shown in FIG. 3.

The stationary fingers 65 and 66 are provided with the fins 72 which give not only additional surface area for heat transfer to the molten mass of material but also bring about additional agitation of the material in cooperation with the stirring device 46.

The temperature of the kettle 20 may be monitored by the thermocouple probe 73 which comprises the lateral pipe 74 which extends through the outer wall 20a of the kettle 20. The pipe 74 is hermetically welded at 75 to prevent the leakage of steam from the kettle jacket.

The pipe 74 is packed with the insulation 76 having a central opening 77 to receive the thermocouple guide 78 to house the thermocouple 80. The temperature reading is taken from temperature indicator 81. The temperature indicator 81 together with the thermocouple may be readily secured to and removed from the pipe 74 by means of the spring clamps 82. The thermocouple 80 is adjustable within the cap 83 to insure that the thermocouple end 84 is in contact with the inner wall 20b of kettle 20.

Figure 7:
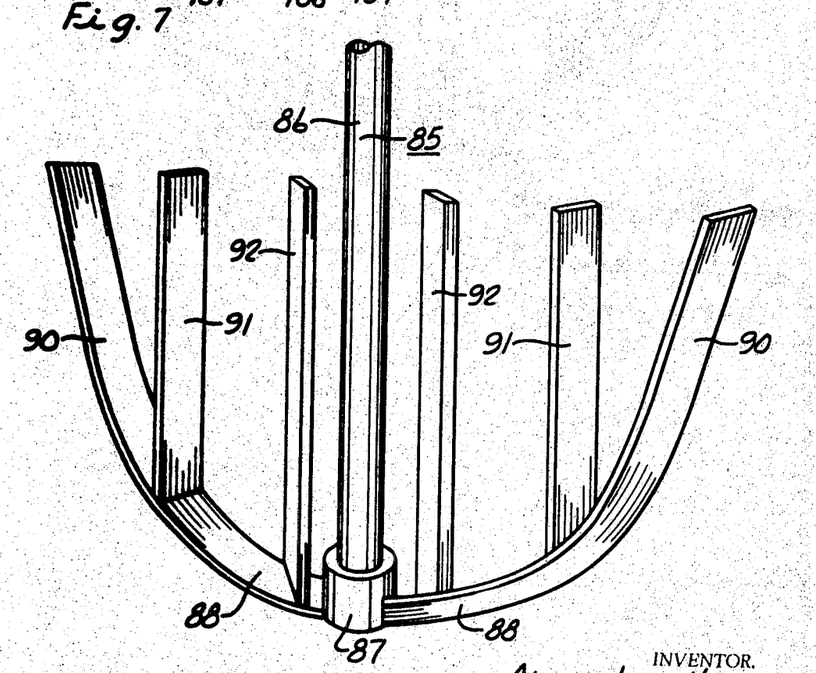
FIG. 7 is a prespective view of a modified form of the stirring device.

In FIG. 7 there is shown still a further modified form of the stirring device comprising this invention. The stirring device 85 is provided with the vertical central shaft 86 which extends down to the connector 87. The connector 87 supports the lateral extensions 88 which are in turn connected to the upwardly extended stirring fingers 90, 91 and 92.

The stirring fingers 90, 91 and 92 are very similar to those shown in the embodiment of the stirring device 56 of FIG. 8 except that there is no provision made for a horizontal arm member such as shown at 57 in FIG. 8. Instead, the shaft 86 together with the lateral extensions 88 and fingers 90, 91 and 92 of FIG. 7 are provided with an inner network of tubing identical to that shown in the embodiment of the stirring device 46 of FIG. 4. Thus the entire surface of the stirring device 85 of FIG. 7 may be uniformly heated to the desired temperature and the temperature maintained on the surfaces by controlling the flow of the heating media, whether it be steam or hot water.

The stirring fingers 90, 91 and 92 of the stirring device 85 are rectangular in cross section. The inner fingers 92 are disposed in parallel planes whereas intermediate stirring fingers 91 are disposed in parallel planes of substantially 90° relative to the planes of the rectangular stirring fingers 92. Outer stirring fingers 90 are disposed in planes substantially parallel to the planes of the intermediate stirring fingers 91. This arrangement of the stirring fingers has been found to be quite successful in folding the viscous soup mass principally during the heating operation wherein the mass is being brought up to the desired liquid temperature, in the case of TNT being 190° F.

Figure 9:
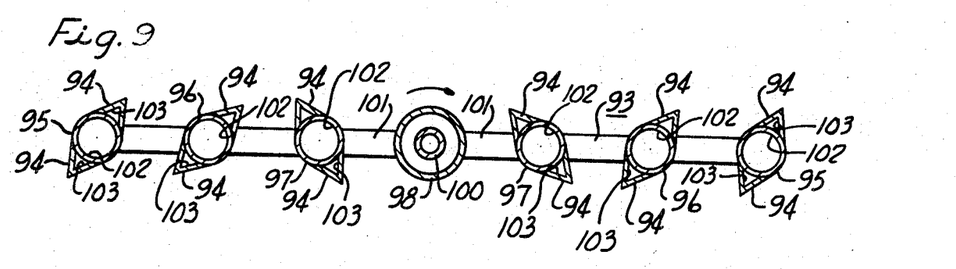
FIG. 9 is a horizontal cross section of still another modified form of the stirring device.

FIG. 9 is still a further embodiment of the form that may be taken by the stirring device utilized in the kettle 20. The stirring device 93 of FIG. 9 is quite similar to the stirring device 46 shown in FIG. 4 except that the stirring device 93 of FIG. 9 is provided with triangularly shaped fins 94 on each of fingers 95, 96 and 97. As in prior cases, the stirring device 93 is provided with a central vertical shaft 98 which also has an inner tubular shaft 100. The outer shaft 98 is connected through a connector to the lateral extensions 101 which supports each of the stirring fingers 95, 96 and 97.

As in the case of stirring device 85 of FIG. 7, the inner stirring fingers 97 are substantially aligned with their cross-sectional longitudinal axes in parallel planes. The cross-sectional longitudinal axes through the intermediate stirring fingers 96 are also in parallel planes, which planes are substantially at right angles to the same planes passing through the inner stirring fingers 97. The outer stirring fingers 95 have their cross-sectional longitudinal axes in substantially parallel planes, which are substantially also parallel to the same planes passing through the intermediate stirring fingers 96.

As can be seen in the case of the stirring device 85 in FIG. 7 the outer stirring fingers 90 cannot be in the exact same plane as the intermediate stirring fingers 91 since the stirring fingers 90 are aligned to be adjacent to the parabolic wall of the kettle 20 whereas the intermediate fingers 91 as well as the inner stirring fingers 92 are substantially vertical having axes parallel to that of the central shaft 86. The same is true in the case of the stirring device 93 shown in FIG. 9. The outer stirring fingers 95 are positioned to be aligned with the curvature of the inner wall 20b of the kettle 20.

Each of the stirring fingers 95, 96 and 97 are provided with an inner tubular shaft 102. Each of the fins 94 on each of the fingers are hollow and thus provided passages 103 for the full length of each of the fingers 95, 96 and 97. The inner passage 102 of the fingers does not extend beyond the passages 103 provided by the fins 94 so that a heating media may be passed through the inner passages 102 and thence through the fin passages 103. In the case of steam as the heating media, steam is passed downwardly through the inner tubular shaft 100, thence through the inner tubular network provided in the lateral extensions 101, and thence upwardly through each of the fingers 95, 96 and 97 through the inner passages 102. At the ends of these fingers, the steam then passes downwardly through the fin passages 103, thence through the lateral extensions 100 and up through the outer tubular shaft 98. If water is used as the heating media, it is preferable that the water circulate in an opposite direction to that just explained for steam.

Figure 10:
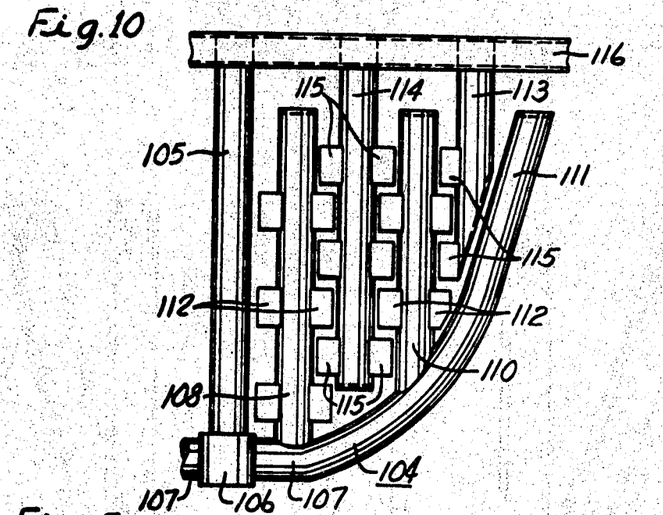
FIG. 10 is a partial side elevation of a further modified form of the stirring device of FIG. 8.

FIG. 10 represents a further embodiment of the stirring device 93 of FIG. 9 and comprises the stirring device 104 having the having the central shaft 105 which is connected to the lateral extensions 107 by means of the connector 106. As mentioned previously with respect to other embodiments of the stirring device, all elements making up the stirring device are preferably welded together with the assurance that there is no possibility of the heating media to escape from between any of the elements as welded together into the material being stirred.

The lateral extensions 107 are provided with the stirring fingers 108, 110 and 111. An inner tubular network is provided for the stirring device 104 identical to that already explained in connection with the stirring device 46 of FIG. 4.

The fingers 108, 110 and 111 of the stirring device 104 are provided with a series of fins 112 which are rectangular in shape as compared to the fins 94 of the stirring device 93 of FIG. 9. However, in the case of the stirring deice 104, the fins 112 are alternated along the length of the stirring fingers 108, 110 and 111 and the shaft 105 in such a way that they pass adjacenily relative to the fins 115 on the stationary hot fingers 113 and 114 dependent from the lid 116 as shown in FIG. 10. The alternate fins 115 on the hot fingers 113 and 114 are also rectangular in cross section.

It can be seen from the embodiment of the stirring device 104 together with the stationary hot fingers 113 and 114 of FIG. 10 that the stirring action is enhanced by the fins 112 and 115 to incease the action of inner folding the mass or material in the kettle 20 in the process of heating the material to the desired temperature or temperaure range.

As it can be seen from the foregoing embodiments together with the kettle structure comprising this invention, it is highly important that the existence of any possibility of the contact of metal parts within the kettle 20 must be absolutely eliminated. This is especially true in the case of thixotropic materials which are highly explosive but at the same time must be heated to a desired temperature wherein the material possesses a rate of flow sufficient obtained by the application of heat and mechanical treatment so that the material may be readily poured into molds or shell casings and thereafter permitted to cool and solidify in the molds or shell casings whatever the case may be. The absence of the possibility of contact by associated metal parts permits the operation of stirring to be carried out safely and at the same time by providing a kettle structure and stirring device which are provided with structural walls permitting the uniform heating of their entire surfaces, which permits precise control of the desired temperature to be obtained by the material being stirred within the kettle 20.

I claim:

1. An apparatus for synthesizing materials to be mixed, brought to and maintained at a predetermined temperature level wherein all areas of the apparatus in contact with said materials have means incorporated therein to provide for uniform heat exchange with said materials comprising:

a vessel having a closure lid each provided with a jacketed conforming covering to direct the circulatory flow of fluid heat exchange media over the entire surface of said vessel and closure lid, a rotatable stirrer in said vessel having a vertically extended tubular shaft journaled exteriorly and centrally of said vessel and comprising, a series of upwardly extended hollow stirring fingers in parallel alignment relative to said central tubular shaft, said stirrer fingers secured to said central tubular shaft by oppositely extended tubular sections from the bottom of said central tubular shaft, the upper ends of said hollow stirring fingers being closed, a hollow stationary fingers depending downwardly from said closure lid and positioned adjacent relative to said stirring fingers to pass therebetween upon rotation of said stirrer.

the lower ends of said hollow stirring fingers being closed, inner interconnected tubular means provided within said stirrer shaft, said stirrer extended sections and said stirrer stirring fingers and inner tubular means provided in said stationary fingers with the ends of each of said tubular means respectively adjacent each of their said closed finger ends, said tubular means ends being open to permit the circulatory flow of a fluid heat exchange media through the interior of said stirrer and said stationary fingers.

2. The apparatus of claim 1 characterized by a T-shaped hollow connector secured to the bottom of said central tubular shaft, said oppositely extended tubular sections secured to said connector and supporting said vertically disposed fingers.

3. The apparatus of claim 1 characterized by means to control the circulatory flow of the fluid heat exchange media through said vessel, said closure lid, said stirrer and said stationary fingers to control the surface temperature of the same.

4. The apparatus of claim 1 characterized in that said stirrer fingers are of circular cross section to provide concentric stirring paths in the material to be synthesized to work the material downwardly and inwardly toward said stirrer shaft.

5. The apparatus of claim 1 characterized in that said stirrer fingers have an elongated cross-sectional contour and positioned transversely relative to said vertical shaft to fold and direct the material to be stirred in a configuration outwardly against the inner surface of said vessel as well as inwardly toward said stirrer shaft.

6. The apparatus of claim 1 characterized in that said stirrer fingers and said stationary fingers have an elongated cross-sectional contour and are positioned transversely relative to said stirrer shaft to fold and direct the material to be stirred in a configuration outwardly against the inner surface of said vessel as well as inwardly toward said stirrer shaft.

7. The apparatus of claim 1 characterized by transversely disposed fins along the surface of said stationary fingers.

8. The apparatus of claim 1 characterized in that each of said stirrer fingers comprise an elongated cross-sectional contour consisting of a pair of oppositely disposed hollow triangularly shaped fins attached to said inner tubular means and closed at their upper ends to enclose said open tubular means ends.

9. An apparatus for the synthesis of materials to be mixed and brought to and maintained at a predetermined temperature comprising a vessel having a closure lid each provided with a jacketed conforming covering to direct the circulatory flow of fluid heat exchange media over the entire surfaces of said vessel and closure lid, characterized by a stirrer in said vessel having a vertically extended shaft journaled exteriorly and centrally of said vessel and comprising a series of vertically disposed fingers secured to said centrally located shaft by laterally extended sections, said stirrer vertical shaft, laterally extended sections and vertically disposed fingers being hollow to provide an internal network chamber, inner interconnected tubular means provided within said vertical shaft, said laterally extended sections and said vertically disposed fingers with tubular openings provided at the end of said tubular means adjacent the ends of said fingers to permit communication into the interior of said network chamber for a fluid heat exchange media passing from said interconnected tubular means through said network chamber, said vertically extending fingers having an elongated cross-sectional contour and positioned transversely relative to said vertical shaft to fold and direct the material to be stirred in a configuration outwardly against the inner surface of said vessel as well as inwardly toward said stirrer shaft, said elongated cross-sectional contour comprising a series of transversely disposed fins secured to each of said stirrer fingers in an alternated pattern along the surfaces thereof.

References Cited
UNITED STATES PATENTS

| | | | |
|---|---|---|---|
| 811,145 | 1/1906 | Higgins | 165—92 |
| 970,719 | 9/1910 | Kennedy | 259—107X |
| 1,854,731 | 4/1932 | Beran | 259—107UX |
| 1,888,008 | 11/1932 | Mortensen | 165—92 |
| 2,085,924 | 7/1937 | Riegler | 23—266UX |
| 2,111,010 | 3/1938 | Sochor | 165—92 |
| 2,118,421 | 5/1938 | Steinmann | 165—92 |
| 2,179,271 | 11/1939 | Pick | 259—107 |
| 2,274,220 | 2/1942 | Sticelber | 107—30X |
| 2,404,380 | 7/1946 | Jensen | 107—30UX |
| 2,445,741 | 7/1948 | Franz et al. | 23—266 |

FOREIGN PATENTS

| | | | |
|---|---|---|---|
| 294,776 | 10/1916 | Germany | 23—266 |
| 305,509 | 10/1920 | Germany | 23—266 |
| 157,174 | 12/1956 | Sweden | 23—266 |

MORRIS O. WOLK, Primary Examiner

B. S. RICHMAN, Assistant Examiner

U.S. Cl. X.R.

23—285; 107—30; 165—73, 92; 259—7, 107